United States Patent [19]

Lew et al.

[11] Patent Number: 5,540,106
[45] Date of Patent: Jul. 30, 1996

[54] ELECTRONIC METHOD FOR MEASURING MASS FLOW RATE

[76] Inventors: Hyok S. Lew; Yon S. Lew, both of 7890 Oak St., Arvada, Colo. 80005

[21] Appl. No.: 14,708

[22] Filed: Feb. 8, 1993

Related U.S. Application Data

[63] Continuation-in-part of Ser. No. 643,420, Jan. 22, 1991, Pat. No. 5,295,398, and Ser. No. 648,121, Jan. 30, 1991, Pat. No. 5,184,518.

[51] Int. Cl.$^6$ ........................................................ G01F 1/84
[52] U.S. Cl. ........................................................ 73/861.356
[58] Field of Search ........................ 73/861.73, 861.38; 364/510

[56] References Cited

U.S. PATENT DOCUMENTS

| | | | |
|---|---|---|---|
| 4,660,421 | 4/1987 | Dahlin et al. | 73/861.38 |
| 4,823,614 | 4/1989 | Dahlin | 73/861.38 |
| 4,914,956 | 4/1990 | Young | 364/510 |
| 5,027,662 | 7/1991 | Titlow et al. | 73/861.38 |
| 5,069,074 | 12/1991 | Young et al. | 73/861.38 |

*Primary Examiner*—Richard Chilcot
*Assistant Examiner*—Harshad Patel

[57] ABSTRACT

A method for determining mass flow rate of media moving through at least one conduit under a flexural vibration comprises analyzing two alternating electrical signals respectively representing the flexural vibration of the conduit at two different sections of the conduit, and determining the mass flow rate as a function of an independent variable generated by a ratio between two groups of various combinations of the two alternating electrical signals, which method also provides a method for determining phase angle difference between two alternating electrical signals without actually measuring the lead time or lag time between the two alternating electrical signals in the time domain.

8 Claims, 4 Drawing Sheets

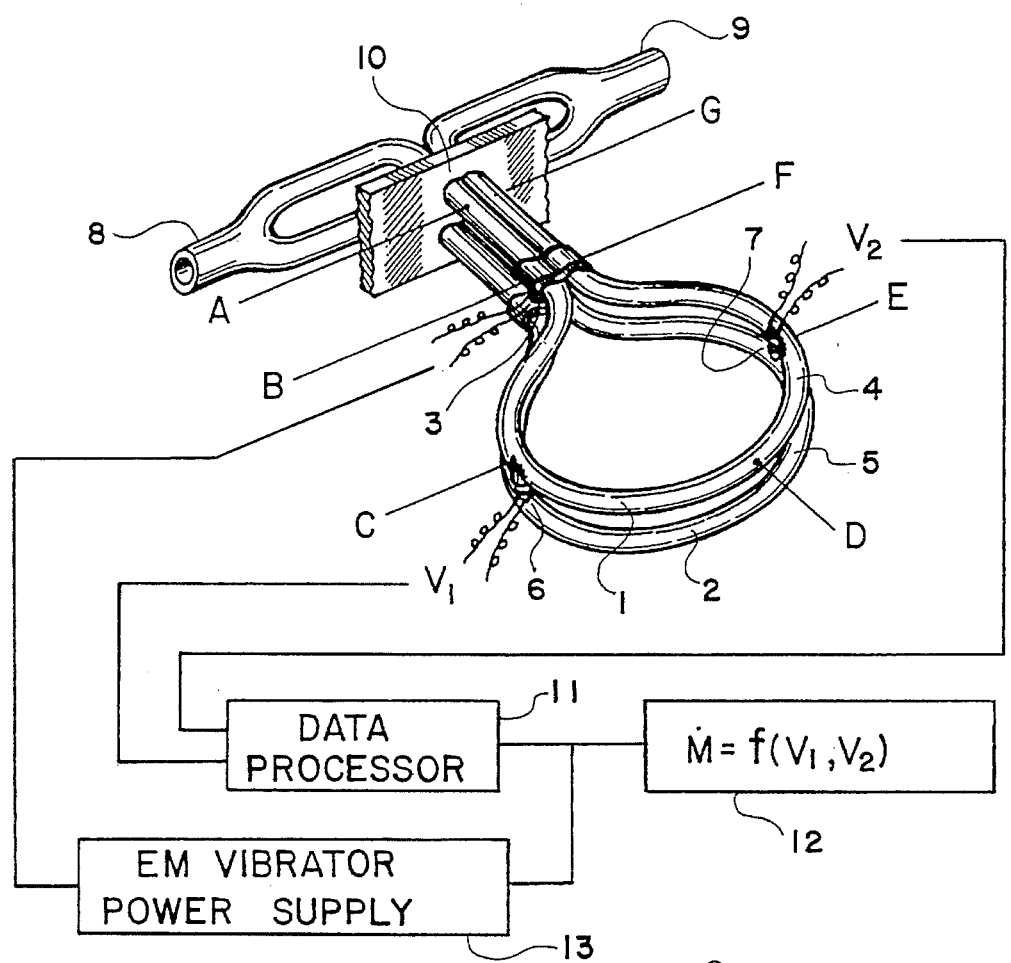
Fig. 1
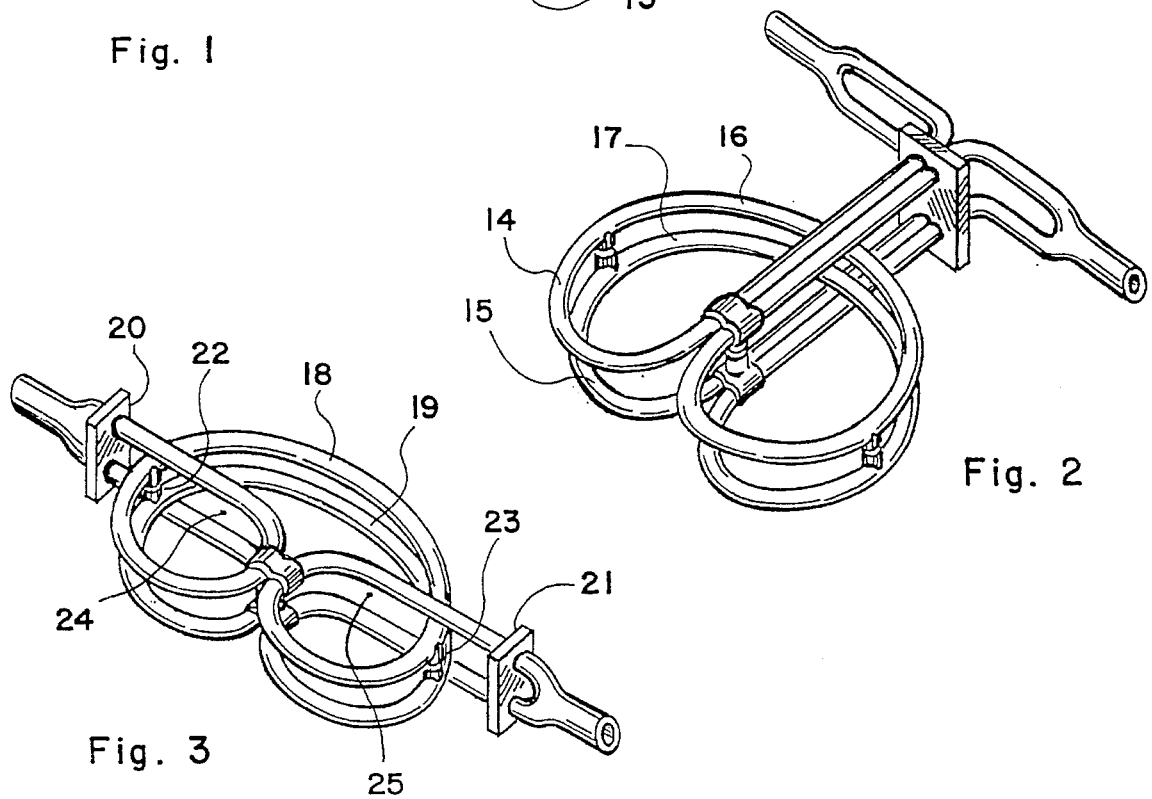
Fig. 2
Fig. 3

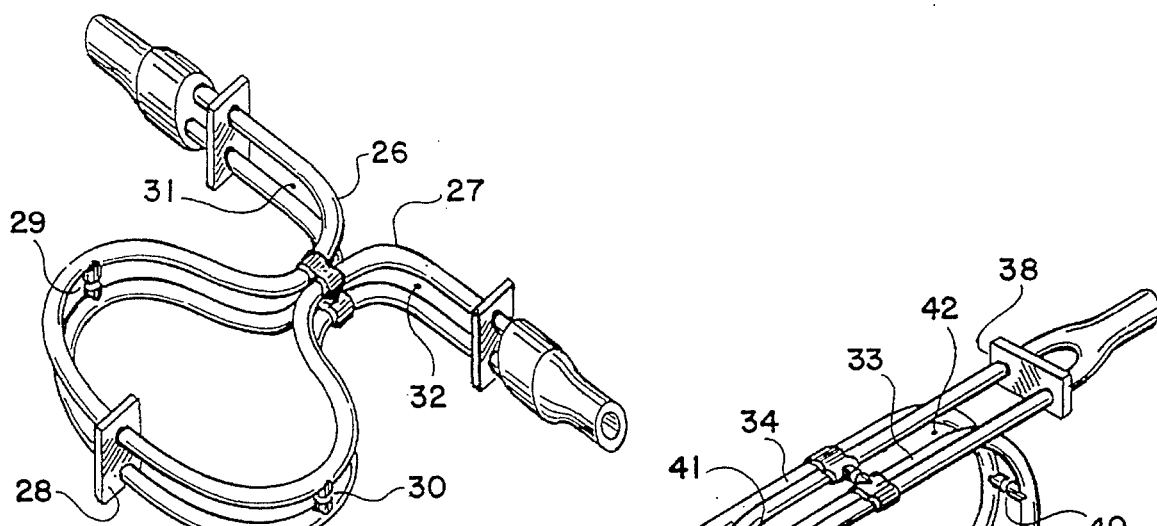
Fig. 4
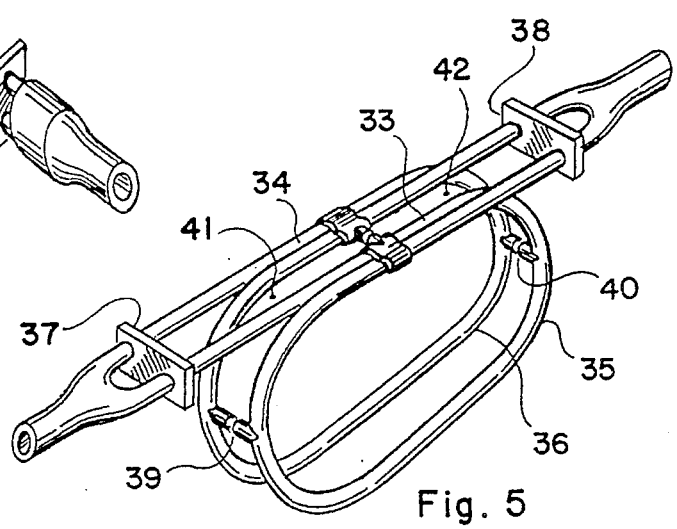
Fig. 5
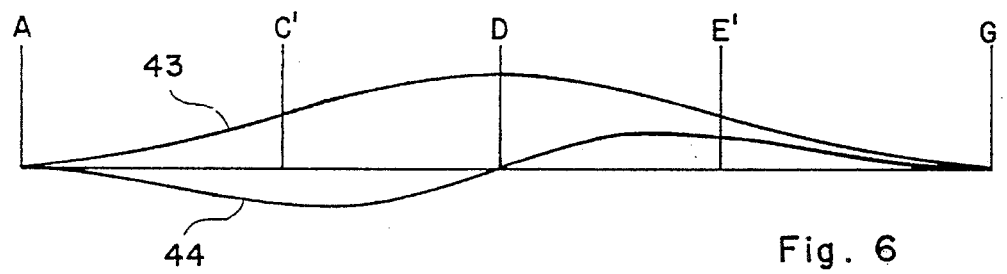
Fig. 6
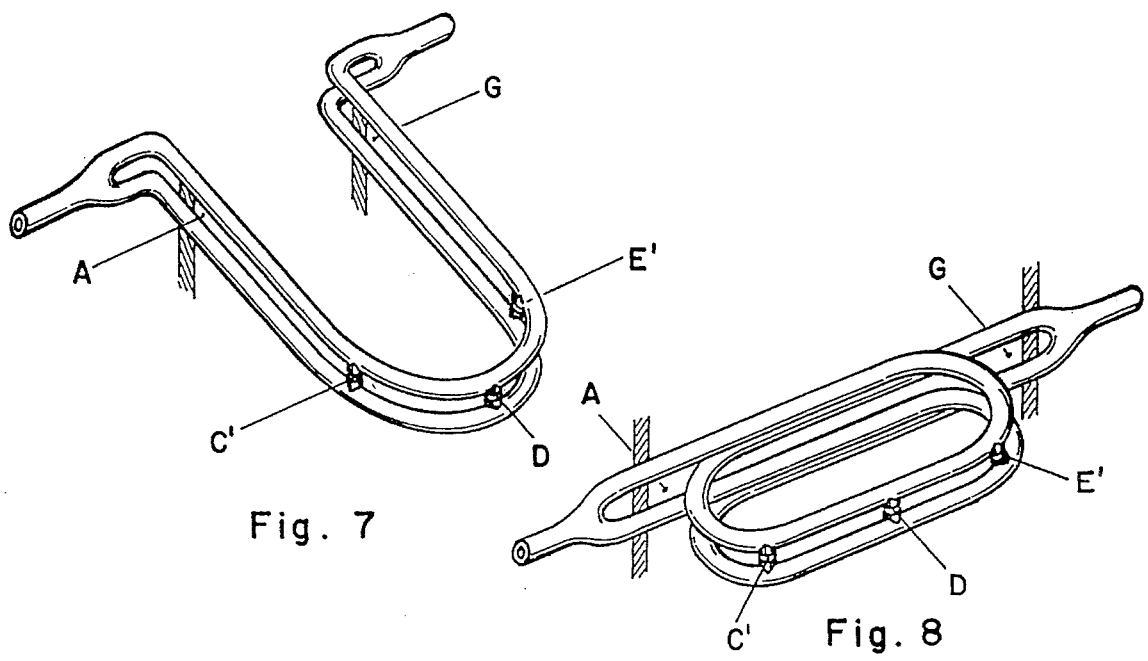
Fig. 7
Fig. 8

5,540,106

ELECTRONIC METHOD FOR MEASURING MASS FLOW RATE

This application is CIP to Ser. No. 07/643,420 filed Jan. 22, 1991, now U.S. Pat. No. 5,295,398 and Ser. No. 07/648, 121 filed Jan. 30, 1991 now U.S. Pat. No. 5,184,518.

FIELD OF INVENTION

The present invention teaches methods, which determines the mass flow rate of media moving through a single conduit under a flexural vibration, or through a pair of conduits under a relative flexural vibration therebetween.

BACKGROUND OF INVENTION

In the conventional method for measuring mass flow rate of media moving through a single conduit under a flexural vibration or through a pair of conduits under a relative flexural vibration therebetween, the phase angle difference between two electrical signals respectively representing the flexural vibration of the conduit at two sections located symmetrically about the midsection of the conduit is measured and the mass flow rate of the media is determined from the phase angle difference by using an empirically determined mathematical relationship therebetween, or the mass flow rate is determined as a function of other parameters directly or indirectly related to the phase angle difference.

BRIEF SUMMARY OF INVENTION

The primary object of the present invention is to provide a method that determines the mass flow rate of media moving through a single conduit under a flexural vibration or a pair of conduits under a relative flexural vibration therebetween from two electrical signals respectively representing the flexural vibration of the conduit at two different sections thereof, wherein the mass flow rate is determined as a function of a differential combination of a product between the first electrical signal and the time derivative of the second electrical signal, and a product between the second electrical signal and the time derivative of the first electrical signal.

Another object is to provide a method that determines the mass flow rate of media as a function of an additive combination of a product between the first and second electrical signals and a product between the time derivatives of the first and second electrical signals.

A further object is to provide a method that determines the mass flow rate of media as a function of a ratio of the differential combination of the two electrical signals defined in the afore-mentioned primary object to the additive combination of the two electrical signals defined in the afore-mentioned another object of the present invention.

Yet another object is to provide a method that determines the mass flow rate of media as a function of a ratio between the amplitude of a differential combination of the normalized first and second electrical signals to the amplitude of an additive combination of the normalized first and second electrical signals, wherein normalized electrical signal is the electrical signal divided by the amplitude of the electrical signal.

Yet a further object is to provide a method that determines the mass flow rate of media as a function of a ratio of the product between a differential combination and an additive combination of the two electrical signals to an additive combination of the product between the first electrical signal and the time derivative of the second electrical signal and the product between the second electrical signal and the time derivative of the first electrical signal.

Still another object is to provide a method that determines the mass flow rate of media as a function of the phase angle difference between an additive combination of the product between the first electrical signal and the time derivative of the second electrical signal and the product between the second electrical signal and the time derivative of the first electrical signal, and the time derivative of square of one of the first and second electrical signals.

Still a further object is to provide a method that determines the mass flow rate of media as a function of the phase angle difference between a differential combination of the product between the first and second electrical signals and the product between the time derivatives of the first and second electrical signals, and a differential combination of the square of the first electrical signal and the square of the time derivative of the first electrical signal, or a differential combination of the square of the second electrical signal and the square of the time derivative of the second electrical signal.

Yet still another object is to provide a method that determines the mass flow rate of media moving through a single conduit with two opposite halves under a relative flexural vibration to one another as a function of the phase angle difference between a first electrical signal representing the absolute flexural vibration of the conduit at the midsection thereof and a second electrical signal representing the relative flexural vibration between two sections of the conduit respectively belonging to two opposite halves of the conduit and disposed in a superimposing or crossing relationship.

Yet a further object is to provide methods that determines the phase angle difference between two electrical signals.

These and other objects of the present invention will become clear as the description thereof progresses.

BRIEF DESCRIPTION OF FIGURES

The present invention may be described with a greater clarity and specificity by referring to the following figures:

FIG. 1 illustrates an embodiment of the mass flowmeter with a pair of conduits under a symmetric primary flexural vibration generated by an electromagnetic vibrator and an antisymmetric secondary flexural vibration generated by the convective inertia force of media moving therethrough, and the electronic circuits processing the data yielding numerical value of the mass flow rate of media moving through the pair of conduits.

FIG. 2 illustrates another embodiment of the mass flowmeter operating in the same mode as that shown in FIG. 1.

FIG. 3 illustrates a further embodiment of the mass flowmeter operating in the same mode as that shown in FIG. 1.

FIG. 4 illustrates yet another embodiment of the mass flowmeter operating in the same mode as that shown in FIG. 1.

FIG. 5 illustrates yet a further embodiment of the mass flowmeter operating in the same mode as that shown in FIG. 1.

FIG. 6 illustrates the distributions of the symmetric primary flexural vibration of the conduit generated by the electromagnetic vibrator and the antisymmetric secondary flexural vibration of the conduit generated by the convective inertia force of the media moving through the individual conduit.

FIG. 7 illustrates a conventional design of the mass flowmeter employing a pair of U-shaped tubes, that can be operated on the principles of the present invention.

FIG. 8 illustrates a conventional design of the mass flowmeter employing a pair of looped conduits, that can be operated on the principles of the present invention.

DESCRIPTION OF METHODS

Figure 9:
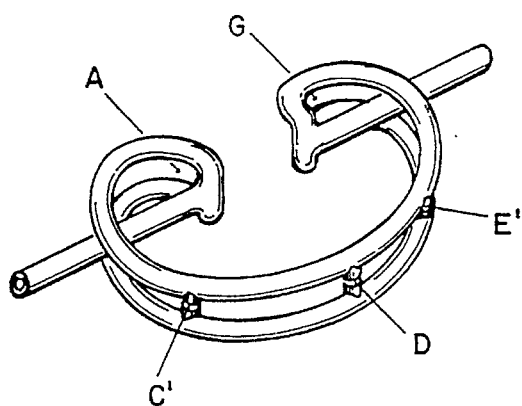
FIG. 9 illustrates a conventional design of the mass flowmeter employing a pair of Cardioid shaped conduits, that can be operated on the principles of the present invention.
Figure 10:
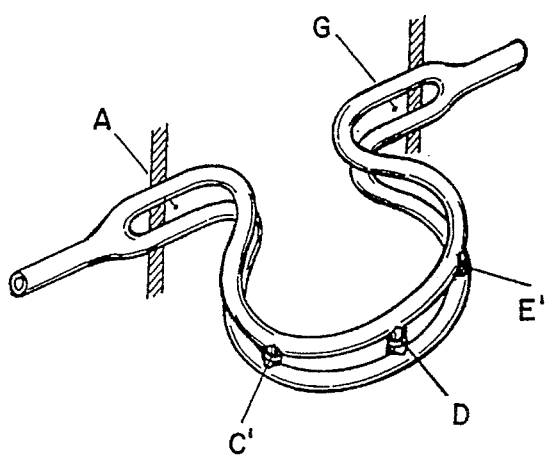
FIG. 10 illustrates a conventional design of the mass flowmeter employing a pair of Omega shaped conduits, that can be operated on the principles of the present invention.
Figure 11:
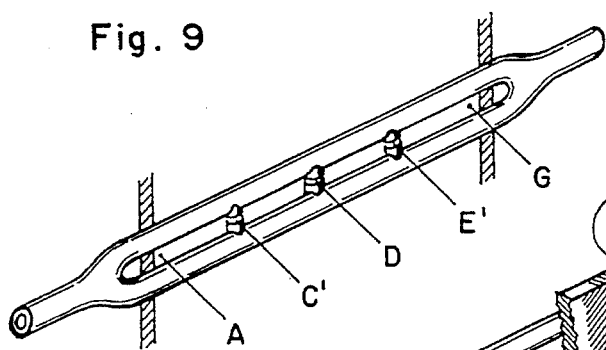
FIG. 11 illustrates a conventional design of the mass flowmeter employing a pair of straight conduits, that can be operated on the principles of the present invention.

In FIG. 1 there is illustrated a typical mechanical embodiment of the mass flowmeter, that operates on the principles taught by the methods of the present invention. The mass flowmeter comprises a pair of conduits 1 and 2 disposed in a parallel and superimposed relationship therebetween, and flexurally vibrated relative to one another by an electromagnetic vibrator 3. A pair of motion sensors 6 and 7 measures the relative flexural vibration between the pair of conduits 1 and 2 at two sections thereof respectively located on the two opposite sides of the midsection of the combination of the pair of conduits 1 and 2. The pair of conduits 1 and 2 respectively including looped midsections 4 and 5 of 360 degree loop angle connects an inlet port 8 and an outlet port 9 to one another in a parallel connection as shown in the particular illustrative embodiment or in a series connection wherein the inlet leg of the first conduit 1 is connected to the inlet port 8, the outlet leg of the first conduit 1 is connected to the inlet leg of the second conduit 2, and the outlet leg of the second conduit is connected to the outlet port 9. Each of the pair of conduits 1 and 2 has two generally straight end sections anchored to a supporting structure 10 at the roots A and G thereof and mechanically tied together at the overhanging extremities B and F by a mechanical clamping or coupling, and the looped midsection 4 or 5. The two opposite halves of the electromagnetic vibrator 3 functioning in an action-reaction relationships are respectively secured to the two mechanical clamps respectively coupling the two pairs of the end sections of the two conduits 1 and 2. The best result is obtained when the combination of the pair of conduits 1 and 2 has a construction symmetric about the midsection D of the combination thereof, and the two motion sensors 6 and 7 are respectively located at two sections C and E located symmetrically about the midsection D, while the methods of the present invention are also compatible with two motion sensors located asymmetrically about the midsection D. Two electrical signals respectively generated by the two motion sensors 6 and 7 and respectively representing the relative flexural vibration between the two conduits at the sections C and E are supplied to a data processor 11, which analyze the two electrical signals by one of the methods taught by the present invention and determines the mass flow rate of media moving through the conduits 1 and/or 2 as a function of the two electrical signals. A data display 12 provides numerical value of the mass flow rate of media determined by the data processor 11. The data processor 11 may also provide the information on the natural frequency of the relative flexural vibration of the pair of conduits 1 and 2 and the phase relationship relative to the electromagnetic vibratory force imposed by the electromagnetic vibrator 3, whereby the electromagnetic vibrator power supply 13 energizes the electromagnetic vibrator 3 in such a way that the relative flexural vibration between the pair of conduits 1 and 2 occurs at the natural frequency thereof. The methods of the present invention defining the operating principles of the data processor 11 will be described in conjunction with FIGS. 6 and 16. It should be understood that the pair of conduits 1 and 2 may be coupled to one another at the midsection D in a revised version of the illustrated embodiment, and that the electromagnetic vibrator 3 may be relocated to the midsection D in another revised version. It should be also understood that one of the pair of conduits 1 and 2 can be omitted and one of the two opposite halves of the electromagnetic vibrator 3, that was originally anchored to the now omitted conduit, can be anchored to a supporting structure. The above-mentioned modifications of the structural embodiment of the mass flowmeter shown in FIG. 1 can be also applied to other embodiments shown in FIGS. 2–5.

In FIG. 2 there is illustrated another embodiment of the mechanical embodiment of the mass flowmeter comprising a pair of conduits 14 and 15, which embodiment results when the looped midsections 16 and 17 of the pair of conduits 14 and 15 respectively connected to the overhanging and clamped extremities of the two pairs of the generally straight end sections are made to extend towards the anchored extremities of those generally straight end sections of the conduits 14 and 15 in contrast to the embodiment shown in FIG. 1, wherein the looped midsection extend away from the anchored extremities of the two conduits 1 and 2. While the looped midsections 16 and 17 are disposed intermediate the two pairs of the generally straight end sections of the conduits 14 and 15 in the particular illustrated embodiment, the structural arrangement can be revised in such a way that the two looped midsections 16 and 17 straddle one or both pairs of the generally straight end sections of the conduits, which structural revision can be also applied to the embodiment shown in FIG. 3.

In FIG. 3 there is illustrated a further mechanical embodiment of the mass flowmeter comprising a pair of conduits 18 and 19 with two opposite root sections thereof respectively secured by two anchoring brackets 20 and 21. It is readily recognized that this mechanical embodiment results when the two generally straight end sections of each of the pair of conduits 14 and 15 shown in FIG. 2, which are disposed in a side-by-side parallel arrangement, are bent away from one another into a new arrangement wherein the two opposite end sections now extend towards one another from the respective anchored extremities thereof. It should be understood that the motion sensors 22 and 23 measuring the relative flexural vibration at the two opposite halves of the combination of the looped midsections of the conduits 18 and 19 may be relocated to a new locations 24 and 25, whereby the pair of relocated motion sensors now measure the relative flexural vibration at the over-hanging sections of the two opposite pairs of the generally straight end sections of the conduits.

In FIG. 4 there is illustrated yet another mechanical embodiment of the mass flowmeter comprising a pair of conduits 26 and 27, which embodiment results when the two generally straight opposite end sections included in each of the pair of conduits shown in FIG. 1 are bent away from one another into a new arrangement wherein the two opposite end sections now extend towards one another from the respective anchored extremities thereof. The bracket 28 mechanically tying together the midsections of the pair of conduits 26 and 27 may be included or omitted. The two motion sensors 29 and 30 may be relocated to new positions 31 and 32.

In FIG. 5 there is illustrated yet a further mechanical embodiment of the mass flowmeter comprising a pair of conduits 33 and 34 respectively including the looped midsection 35 and 36 of 360 degree loop angle, wherein the two generally straight opposite end sections of each of the pair of conduit are disposed tangentially to the respective 360 degree looped midsection, and anchored respectively by a pair of anchoring brackets 37 and 38 at the two two opposite extremities of the pair of conduits 33 and 34. The two motion sensors 39 and 40 may be relocated to new positions 41 and 42.

In FIG. 6 there is illustrated the distributions of the symmetric primary flexural vibration of the conduit generated by the electromagnetic vibrator, and the antisymmetric secondary flexural vibration of the conduit generated by the convective inertia force of media moving through the conduit.

It can be easily shown by simultaneously solving the equations of motions of a conduit under flexural vibration and of media moving through the conduit that the flexural vibration of a conduit created by a combined effect of an electromagnetic vibrator exerting a vibratory force on the conduit and the inertia force of the media moving through the conduit is described by the following equation:

$$v(x,t) = v_0(x)\cos\omega t + \frac{\dot{M}}{EI} v_1(x)\sin\omega t, \qquad (1)$$

where $v(x,t)$ is the velocity of the flexural vibration of the conduit at a section at a distance x from the midsection D of the conduit and at time t, $\omega$ is the circular frequency of the flexural vibration of the conduit, $\dot{M}$ is the mass flow rate of media moving through the conduit, E is the modulus of elasticity of the material making up the conduit, I is the moment of inertia of the cross sectional area of the conduit, $v_0(x)\cos\omega t$ is the primary flexural vibration of the conduit created by the electromagnetic vibrator, and $(\dot{M}/EI) V_1(x) \sin\omega t$ is the secondary flexural vibration of the conduit created by the dynamic interaction between the primary flexural vibration of the conduit and the convective motion of the media moving through the conduit; wherein $v_1(x)$ is related to $V_0(x)$ by the following differential equation:

$$\frac{d^4 v_1(x)}{dx^4} - \frac{m+\rho S}{EI} \omega^2 v_1(x) = -\omega \frac{dv_0(x)}{dx}, \qquad (2)$$

where m is the mass of the conduit per unit length thereof, $\zeta$ is the density of the media moving through the conduit, and S is the cross sectional area of the flow passage provided by the conduit. When the conduit containing the moving media is flexurally vibrated at a natural frequency thereof, which natural frequency is give by equation $$\omega = K \sqrt{\frac{EI}{m+\rho S}}, \qquad (3)$$

the equation (2) reduces to the following form:

$$\frac{d^4 v_1(x)}{dx^4} - K^2 v_1(x) = -\omega \frac{dv_0(x)}{dx}, \qquad (4)$$

where K is a characteristic constant determined by the boundary conditions of the vibrating conduit. By using the addition or subtraction formula of the trigonometric functions, it can be easily shown that the equation (1) can be written in the form $$v(x,t) = A(x)\{\cos[\omega t - \phi(x)]\}, \qquad (5)$$

where $$A(x) = \sqrt{[v_0(x)]^2 + \left[\frac{\dot{M}}{EI} v_1(x)\right]^2}, \qquad (6)$$

and $$\tan\phi(x) = \frac{v_1(x)}{v_0(x)} \frac{\dot{M}}{EI}. \qquad (7)$$

Two motion sensors respectively located at x=a and x=b provide two alternating electrical signals respectively proportional to $v(x,t)$ given by the equation (5) wherein x therein is now substituted with a and b, which two alternating electrical signals are of the following forms:

$$E_a(t)=\alpha A_a \cos(\omega t - \phi_a), \qquad (8)$$

and $$E_b(t)=\beta A_b \cos(\omega t - \phi_b), \qquad (9)$$

where $\alpha$ and $\beta$ are respectively the electrical amplification coefficients of the two motion sensors. It should be understood that the equations (1) through (9) are valid for all modes of the flexural vibration of the conduit which may be symmetric, antisymmetric or asymmetric about the midsection D of the conduit.

Again by using the addition or substraction formula of the trigonometric functions, it can be readily discovered that the following relationships exist:

$$\frac{dE_a(t)}{dt} E_b(t) - E_a(t) \frac{dE_b(t)}{dt} = \omega \alpha \beta A_a A_b \sin(\phi_a - \phi_b), \quad (10)$$

and $$\frac{dE_a(t)}{dt} \frac{dE_b(t)}{dt} + \omega^2 E_a(t) E_b(t) = \omega^2 \alpha \beta A_a A_b \cos(\phi_a - \phi_b). \quad (11)$$

By using the equations (7), (10) and (11), the following relationship is obtained:

$$\dot{M} = C_1 \omega \frac{\dot{E}_a E_b - E_a \dot{E}_b}{\dot{E}_a \dot{E}_b + \omega^2 E_a E_b}, \quad (12)$$

where $\dot{E}$ stands for $dE/dt$, and the constant $C_1$ is equal to $$C_1 = EIl \left[ \frac{v_1(a)}{v_0(a)} - \frac{v_1(b)}{v_0(b)} \right], \quad (13)$$

According to the equation (12), the mass flow rate can be determined as a function of the ratio of a differential combination of a product between the second electrical signal and the time derivative of the first electrical signal and a product between the first electrical signal and the time derivative of the second electrical signal to an additive combination of a product between the time derivatives of the first and second electrical signals and a product between the first and second electrical signals times square of the circular frequency of the flexural vibration, wherein the two electrical signals respectively represent the flexural vibration of the conduit at two different sections thereof and respectively supplied by the two motion sensors. In measuring the mass flow by the above-presented method, an empirically obtained mathematical relationship should be used instead of a theoretical equation such as the equation (12). In most applications, the phase angle difference ($\emptyset_a - \emptyset_b$) in the flexural vibration between the two different sections of the conduit x=a and x=b remains very small, and consequently, the equation (11) can be approximated by $$\frac{dE_a(t)}{dt} \frac{dE_b(t)}{dt} + \omega^2 E_a(t) E_b(t) = \omega^2 \alpha \beta A_a A_b. \quad (14)$$

Therefore, an approximate form of the equation (12) given by the following equation may be used in determining the mass flow rate:

$$\dot{M} = C_1 \omega \frac{\dot{E}_a E_b - E_a \dot{E}_b}{(Amp.\ E_a)(Amp.\ E_b)}, \quad (15)$$

where (Amp. E) stands for the amplitude of the electrical signal E. According to the equation (15), the mass flow rate can be determined as a function of the ratio of a differential combination of a product between the second electrical signal and the time derivative of the first electrical signal and a product between the first electrical signal and the time derivative of the second electrical signal to a product between the amplitudes of the first and second electrical signals. It is amusing to notice that the equation (7) provides the theoretical foundation establishing the conventional method of determining the mass flow rate as a function of the phase angle difference, wherein the phase difference in time between the two electrical signals is measured and then the circular frequency is multiplied thereto to obtain the phase angle difference, and the mass flow rate is determined as a linear function of the phase angle difference. The method of the present invention based on the equations (12) or (15) deals directly with the two electrical signals without getting into the comparison analysis of the two electrical signals in the time domain and consequently, provides a more accurate, reliable and economic way to determine the mass flow rate compared with the conventional method requiring the comparison analysis of the two electrical signals in the time domain.

The normalized form $e_a$ and $e_b$ of the two electrical signals $E_a$ and $E_b$ respectively given by the equations (8) and (9) are defined as follows:

$$e_a(t) = \frac{E_a(t)}{(Amp.\ E_a)} = \cos(\omega t - \phi_a), \quad (16)$$

and $$e_{b(t)} = \frac{E_b(t)}{(Amp.\ E_b)} = \cos(\omega t - \phi_b). \quad (17)$$

Again by using the addition or subtraction formula of the trigonometric functions, it is discovered that the following relationship exists:

$$e_a^2 - e_b^2 = 1/2[(\cos 2\emptyset_a - \cos 2\emptyset_b) \cos 2\omega t + (\sin 2\emptyset_a - \sin 2\emptyset_b) \sin 2\omega t], \quad (18)$$

and $$\dot{e}_a e_b + e_a \dot{e}_b = \sin(\emptyset_a + \emptyset_b) \cos 2\omega t - \cos(\emptyset_a + \emptyset_b) \sin 2\omega t. \quad (19)$$

The implication made by the equation (4) is that, when the primary flexural vibration of the conduit generated by the electromagnetic vibrator is symmetric about the midsection D of the conduit, the secondary flexural vibration generated by the convective inertia force of the media is antisymmetric about the midsection D of the conduit, and when the primary flexural vibration of the conduit is antisymmetric about the midsection D of the conduit, the secondary flexural vibration of the conduit is symmetric about the midsection of the conduit. It follows from the above-mentioned fact and the equation (7) that the phase angle $\emptyset(x)$ is an antisymmetric function of x and must vanish at the midsection D of the conduit whereat x is equal to zero. Therefore, it is important to define the phase angle $\emptyset$ in such a way that it vanishes at the midsection D of the conduit. When the conduit is vibrated in a mode having a symmetric primary flexural vibration and an antisymmetric secondary flexural vibration or in a mode having an antisymmetric primary flexural vibration and a symmetric secondary flexural vibration, and the two motion sensors are disposed symmetrically about the midsection D of the conduit, the following relationship exists:

$$\emptyset_a = -\emptyset_b = \emptyset \quad (20)$$

The equations (18), (19) and (20) yield the following relationship:

$$\frac{\omega(e_b^2 - e_a^2)}{\dot{e}_a e_b + e_a \dot{e}_b} = \sin 2\phi. \quad (21)$$

In most cases of the mass flow measurements, the phase angle $\emptyset$ remains very small and consequently, $\sin 2\emptyset$ is approximately equal to $\tan 2\emptyset$. The equations (7) and (21) yields equation $$\dot{M} = C_2 \omega \frac{e_b^2 - e_a^2}{\dot{e}_a e_b + e_a \dot{e}_b}, \quad (22)$$

where the constant $C_2$ is equal to $$C_2 = \frac{v_2(a)}{2 v_1(a)} EI. \quad (23)$$

According to the equation (22), the mass flow rate can be determined as a function of the ratio of a differential combination of the square of the normalized first electrical signal and the square of the normalized second electrical signal to an additive combination of a product between the normalized second electrical signal and the time derivative of the normalized first electrical signal and a product between the normalized first electrical signal and the time derivative of the normalized second electrical signal. If the amplification factors of the two motion sensors are matched to one another, the normalized electrical signals $e_a$ and $e_b$ appearing in the equation (22) can be replaced by the unnormalized electrical signals $E_a$ and $E_b$.

If $\emptyset_a = -\emptyset_b = \emptyset$, the equations (16) and (17) provides the following relationships:

$$e_a - e_b = 2 \sin \emptyset \sin \omega t, \quad (24)$$

and $$e_a + e_b = 2 \cos \emptyset \cos \omega t. \quad (25)$$

When the ratio of the amplitudes of two vibrations respectively represented by the equations (24) and (25) are taken, the following relationship results:

$$\frac{\text{Amp. } (e_a - e_b)}{\text{Amp. } (e_a + e_b)} = \tan \phi. \quad (26)$$

The equations (7) and (26) yield equation $$\dot{M} = C_3 \frac{\text{Amp. } (e_a - e_b)}{\text{Amp. } (e_a + e_b)}, \quad (27)$$

where the constant $C_3$ is equal to $$C_3 = \frac{v_1(a)}{v_0(a)} EI. \quad (28)$$

According to the equation (27), the mass flow rate can be determined as a function of a ratio of the amplitude of a differential combination of the normalized first electrical signal and the normalized second electrical signal to the amplitude of an additive combination of the normalized first electrical signal and the normalized second electrical signal. If the amplification factors of the two motion sensors are matched to one another, the normalized electrical signals $e_a$ and $e_b$ appearing in the equation (27) can be replaced by the unnormalized electrical signals $E_a$ and $E_b$.

If $\emptyset_a = -\emptyset_b = \emptyset$, equations (8) and (9) satisfy the following relationships:

$$E_a \dot{E}_a = -\tfrac{1}{2} \alpha^2 (A_a)^2 \omega \sin 2(\omega t - \emptyset), \quad (29)$$

$$E_b \dot{E}_b = -\tfrac{1}{2} \beta^2 (A_b)^2 \omega \sin 2(\omega t + \emptyset), \quad (30)$$

$$\dot{E}_a E_b + E_a \dot{E}_b = -\alpha \beta A_a A_b \omega \sin 2\omega t, \quad (31)$$

$$\omega^2 E_a^2 - \dot{E}_a^2 = (\alpha A_a \omega)^2 \cos 2(\omega t - \emptyset), \quad (32)$$

$$\omega^2 E_b^2 - \dot{E}_b^2 = (\beta A_b \omega)^2 \cos 2(\omega t + \emptyset), \quad (33)$$

$$\omega^2 E_a E_b - \dot{E}_a \dot{E}_b = \alpha \beta A_a A_b \omega^2 \cos 2\omega t. \quad (34)$$

According to the equations (29), (30) and (31), the phase angle difference between any two of the three electrical signals, the product between the first electrical signal and the time derivative of the first electrical signal, the product between the second electrical signal and the time derivative of the second electrical signal, and an additional combination of the product between the second electrical signal and the time derivative of the first electrical signal and the product between the first electrical signal and the time derivative of the second electrical signal, can be measured and the mass flow rate can be determined as a function of the measured phase angle difference. It is also noticed that, according to the equations (32), (33) and (34), the phase angle difference between any two of the three electrical signals, a differential combination of the square of the first electrical signal times the square of the circular frequency of the first electrical signal and the square of the time derivative of the first electrical signal, a differential combination of the square of the second electrical signal times the square of the circular frequency of the second electrical signal and the square of the time derivative of the second electrical signal, and a differential combination of the product between the first and second electrical signals times the square of the circular frequency of the electrical signal and the product between the time derivatives of the first and second electrical signals, can be measured and the mass flow rate can be determined as a function of the measured phase angle difference. The determination of the mass flow rate as a function of the phase angle difference between two electrical signals respectively defined by the equations (29) and (30) or the phase angle difference between two electrical signals respectively defined by the equations (32) and (33), provides an advantage in measuring very low values of the mass flow rate, as the phase angle difference between the above-mentioned two electrical signals equal to $4\emptyset$ is twice greater than the phase angle difference between the first and second electrical sginals respectively given by the equations (8) and (9) that is equal to $2\emptyset$.

While the phase angle between two electrical signals may be determined by the conventional method, wherein the zero crossings or peaking of the two electrical signals are timed and the phase angle difference between the two electrical signals is obtained by multiplying the circular frequency to the time interval between the zero crossings or peaking of the two electrical signals, the following methods of the present invention teaches how to measure the phase angle difference between two electrical signals in a more accurate, reliable and economic manner: It can be readily shown by using the addition or subtraction formula of the trigonometric functions that the equations (8) and (9) satisfy the relationships $$E_a = \pm \alpha A_a \sin (\emptyset_a - \emptyset_b) \text{ when } E_b \text{ reaches a zero value,} \quad (35)$$

and $$E_a = \pm \beta A_a \cos (\emptyset_a - \emptyset_b) \text{ when } E_b \text{ reaches a peak value.} \quad (36)$$

The equations (35) and (36) provide the following relationship:

$$\tan(\phi_a - \phi_b) = \frac{E_a|_{\text{measured when } E_b \text{ reaches a zero value.}}}{E_a|_{\text{measured when } E_b \text{ reaches a peak value.}}} \quad (37)$$

According to the equation (37), the tangent of the phase angle difference between two harmonic signals $E_a$ and $E_b$ is equal to the ratio of the value of the first signal measured at an instant when the value of the second signal is equal to zero to the value of the first signal taken at another instant when the second signal reaches its peak value, and consequently, the phase angle difference can be determined from the aforementioned ratio. The method for determining the mass flow rate of media based on the equations (7) and (37) has been described and claimed in the parent applications of the present application.

The equations (10) and (11) satisfy the following relationship:

$$\tan(\phi_a - \phi_b) = \omega \cdot \frac{\dot{E}_a E_b - E_a \dot{E}_b}{E_a E_b + \omega^2 E_a E_b}. \quad (38)$$

According to the equation (38), the tangent of the phase angle difference between two harmonic signals $E_a$ and $E_b$ is equal to the circular frequency of the harmonic signals times the ratio of the difference between the second signal times the time derivative of the first signal and the first signal times the time derivative of the second signal to the sum of the square of the time derivatives of the two signals and the square of the two signals times the square of the circular frequency, and consequently, the phase angle difference, between the two harmonic signals can be determined by the aforementioned ratio. The two methods for measuring the phase angle difference between two harmonic signals respectively defined by the equations (37) and (38) can be used to determine the phase angle difference between any two electrical signals of the three electrical signals given by equations (29), (30) and (31) or the phase angle difference between any two electrical signals of the three electrical signals given by the equations (32), (33) and (34). When the equation (37) or (38) is used to determine the phase angle difference between two harmonic electrical signals in conjunction with the determination of the mass flow rate, the tangent of the phase angle difference provided by the equation (37) or (38) should be used directly without calculating the phase angle difference itself, as the mass flow rate is proportional to the tangent of the phase angle difference instead of the phase angle difference itself. The most important application of the equation (37) or (38) lies in the construction and operation of an instrument that measures the phase angle difference between two harmonic signals, or two square wave signals or two saw-tooth signals. When the two signals are not harmonic signals as in the case of the square wave signals or the saw-tooth signals, the nonharmonic signals must be passed through filters or harmonic converters converting the nonharmonic signals to the harmonic signals. It should be understood that the present invention teaches new methods for measuring the mass flow rate as well as new methods for measuring the phase angle difference between two electrical signals.

The embodiments of the mass flowmeters shown in FIGS. 1–5 experiences the symmetric primary flexural vibration of the conduit generated by the electromagnetic vibrator, that has a distribution represented by a symmetric curve 43, and the antisymmetric secondary flexural vibration of the conduit generated by the convective inertia force of the media moving through the conduit, that has a distribution represented by the antisymmetric curve 44. The mass flow rate through one or both of the two conduits included in the embodiments of the mass flow rate can be determined by any one of the methods based on the equations (12), (15), (22), (27), (29–31), (32–34) and (37). The data processor 11 shown in FIG. 1, that receives the two electrical signals $E_a(t)$ and $E_b(t)$ respectively representing the flexural vibrations $V_1$ and $V_2$ at two different sections of the conduit, executes the algorithms or calculations defined by one of the equations (12), (15), (22), (27), (29–31), (32–34) and (37), and determines the mass flow rate $\dot{M}$ that is displayed or put out by the data display 12.

In FIG. 7–11, there are illustrated some representative examples of the existing versions of the Coriolis force mass flowmeter, that employs the principles of the symmetric primary flexural vibration and the antisymmetric secondary flexural vibration of the conduit. All of these versions of the mass flowmeter can be operated on the data processing methods of the present invention and benefit thereby in terms of reduced capital cost and improved operating performance.

Figure 12:
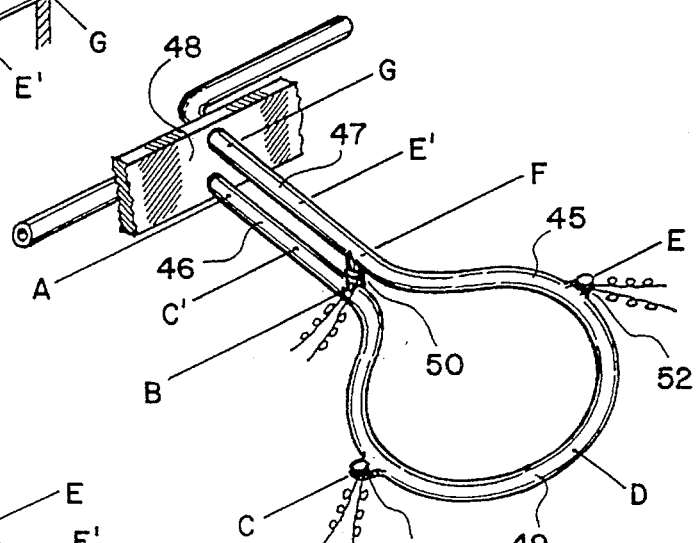
FIG. 12 illustrates an embodiment of the mass flowmeter with a single conduit under an antisymmetric primary flexural vibration generated by an electromagnetic vibrator and a symmetric secondary flexural vibration generated by the convective inertia force of media moving through the conduit.

In FIG. 12 there is illustrated an embodiment of the mass flowmeter comprising a single conduit 45 including two generally straight end sections 46 and 47 disposed on a first plane and anchored to a supporting structure 48 at the roots A and G thereof, and a looped midsection 49 of 360 degree loop angle disposed on a second plane approximately perpendicular to the first plane including the two generally straight end sections 46 and 47 of the conduit 45. The electromagnetic vibrator 50 with two opposite halves respectively secured to the over-hanging extremities B and F of the two generally straight end sections 46 and 47, flexurally vibrates the two opposite halves of the conduit 45 in two opposite directions parallel to the first plane including the two generally straight end sections 46 and 47 and perpendicular to the two generally straight end sections 46 and 47 of the conduit 45. The two motion sensors 51 and 52 of the accelerometer type or piezo electric vibrometer type respectively disposed at two sections C and E belonging to the two opposite halves of the conduit 45 in a sysmmetric relationship about the midsection D of the conduit provide the first and second electrical signals respectively given by the equations (8) and (9). The conduit 45 experiences an antisymmetric primary flexural vibration generated by the electromagnetic vibrator 50 and a symmetric secondary flexural vibration generated by the convective inertia force of media moving through the conduit 45. In a revised version of the embodiment shown in FIG. 12, the two motion sensors 51 and 52 can be respectively relocated to new section C' and E' respectively belonging to the two generally straight end sections 46 and 47 of the conduit 45. The mass flowmeter employing a single conduit provides an advantage over the mass flowmeters employing a pair of conduits in terms of the capital cost and operating performance, as the single conduit construction is much less expensive compared with the dual conduit construction, and the single conduit design displays a greater Coriolis force effect compared with the dual conduit construction bifurcating the media flow.

Figure 13:
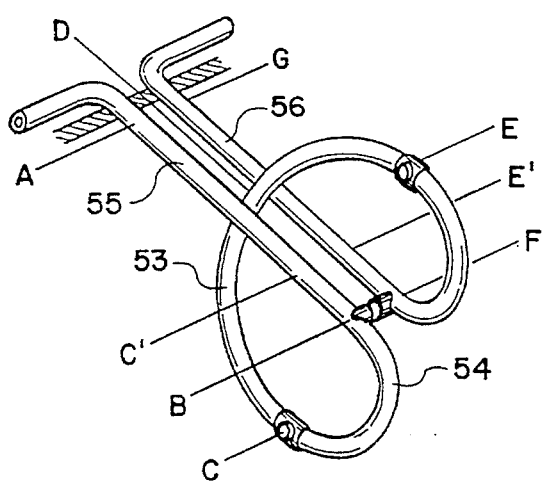
FIG. 13 illustrates another embodiment of the mass flowmeter operating in the same mode as that shown in FIG. 12.

In FIG. 13 there is illustrated another embodiment of a single conduit mass flowmeter, that is a modified version of the embodiment shown in FIG. 12. While the looped midsection 49 connected to the over-hanging extremities of the two generally straight end sections 46 and 47 of the conduit, extends away from the two anchored extremities A and G of the conduit 45 in the embodiment shown in FIG. 12, the looped midsection 53 of the conduit 54 extends towards the two anchored extremities A and G of the conduit 54 and passes through a space between the two generally straight end sections 55 and 56 of the conduit 54. In a revised version, the two motion sensors may be relocated from the existing positions C and E to the new positions C' and E'.

Figure 14:
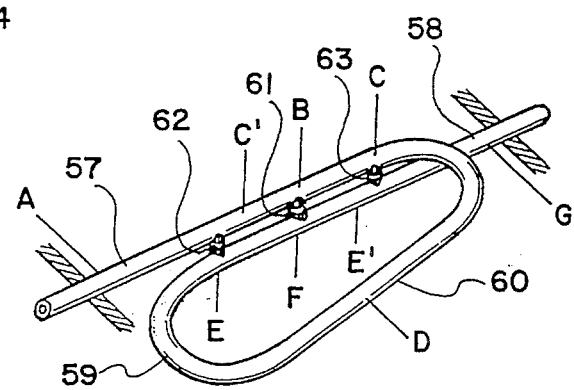
FIG. 14 illustrates a further embodiment of the mass flowmeter operating in the same mode as that shown in FIG. 12.

In FIG. 14 there is illustrated a further embodiment of the single conduit mass flowmeter wherein the two generally straight end sections 57 and 58 of the conduit 59 extends from the looped midsection 60 of 360 degree loop angle in two opposite directions in a tangential relationship to the looped midsection 60. The electromagnetic vibrator 61 is disposed on the plane of symmetry intersecting the midsection D of the conduit and perpendicular to the two generally straight end sections 57 and 58 of the conduit 59. A pair of relative motion sensors 62 and 63 measuring relative flexural vibration between the two generally straight end sections 57 of the conduit 59 are disposed symmetrically about the plane of symmetry including the electromagnetic vibrator 61 and the midsection D of the conduit 59. In a revised version of the embodiment, the two relative motion sensors 62 and 67 may be replaced by two vibration sensors of the accelerometer type, which are now included respectively in the two opposite halves of the looped midsection of the conduit 59 in a symmetric relationship about the midsection D of the conduit 59, or in two new sections C' and E' respectively belonging to the two generally straight end sections 57 and 58 of the conduit 59.

Figure 15:
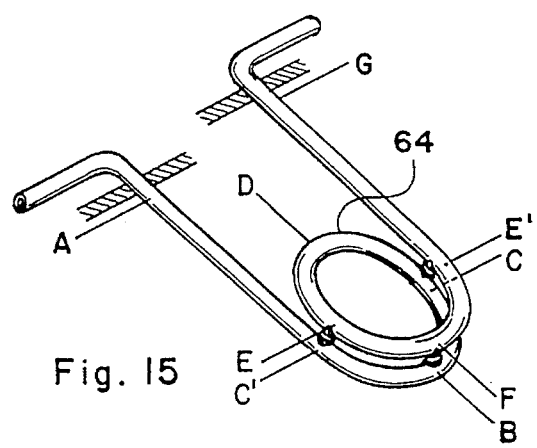
FIG. 15 illustrates yet another embodiment of the mass flowmeter operating in the same mode as that shown in FIG. 12.

In FIG. 15 there is illustrated yet another embodiment of the single conduit mass flowmeter, that is the modified version of the embodiment shown in FIG. 14, wherein this embodiment has the looped midsection 64 of 540 degree loop angle instead of the 360 degree loop angle employed in the embodiment shown in FIG. 14.

Figure 16:
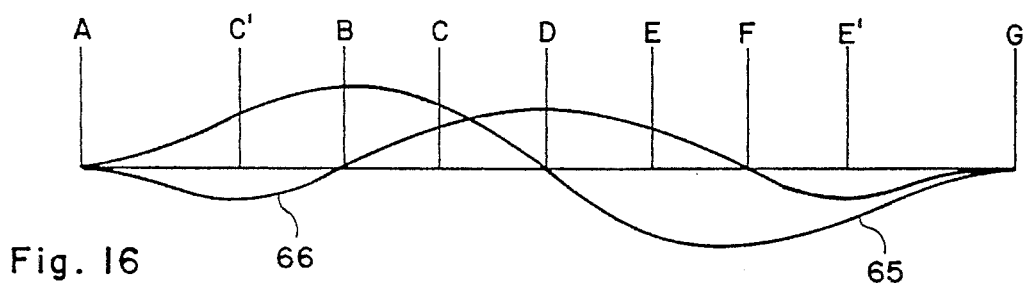
FIG. 16 illustrates the distributions of the antisymmetric primary flexural vibration of the conduit generated by the electromagnetic vibrator and the symmetric secondary flexural vibration of the conduit generated by the convective inertia force of the media moving through the conduit.

In FIG. 16 there is illustrated the distributions of the antisymmetric primary flexural vibration of the conduit generated by the electromagnetic vibrator, that is represented by the antisymmetric curve 65, and the symmetric secondary flexural vibration generated by the convective inertia force of media moving through the conduit, that is represented by the symmetric curve 66, which combination of the flexural vibrations is experienced by the conduits included in the mass flowmeters shown in FIGS. 12–15.

As the single conduit included in the mass flowmeters shown in FIGS. 12–15 is flexurally vibrated in a mode having the antisymmetric primary flexural vibration and the symmetric secondary flexural vibration, the phase angle $\emptyset$ appearing in the equations (7), (8) and (9) must be changed to $(\emptyset+\pi/2)$. An useful embodiment of the installation of the two motion sensors in the mass flowmeters shown in FIGS. 12–15 is to install an absolute motion sensor at the midsection D of the conduit and a relative motion sensor adjacent to the electromagnetic vibrator on the plane of symmetry. For example, the two opposite halves of the relative motion sensor can be respectively secured to the sections C' and E' respectively belonging to the two generally straight end sections of the conduit shown in FIGS. 12 and 13. The two electric signals respectively provided by the absolute motion sensor located at the midsection D of the conduit and by the relative motion sensor measuring the relative flexural vibration between the two generally straight end sections of the conduit are respectively given by equations $$E_0(t)=\alpha A_0 \sin \omega t, \quad (39)$$

and $$E_b(t)=2\beta A_b \sin (\omega t-\emptyset_b). \quad (40)$$

The mass flow rate of media moving through the conduit is related to the phase angle difference between the two electrical signals respectively provided by the absolute motion sensor and the relative motion sensor by the following equation:

$$\dot{M}=C_b \cot \emptyset_b, \quad (41)$$

where the constant C is equal to $$C_4 = \frac{v_0(b)}{v_1(b)} EI. \quad (42)$$

According to the equation (41), the mass flow rate of media moving through the conduit under the antisymmetric primary flexural vibration and the symmetric secondary flexural vibration can be determined as a function of the phase angle difference between two electrical signals respectively provided by an absolute motion sensor disposed at the midsection of the conduit and a relative motion sensor measuring the relative flexural vibration between the two generally straight end sections of the conduit. While the equations (12), (15), (22), (29–31) and (32–34) defining the methods for measuring the mass flow rate remain valid for the single conduit mass flowmeters shown in FIGS. 12–15, the equation (27) must be revised to the following form in order to operate in conjunction with the single conduit mass flowmeters shown in FIG. 12–15:

$$\dot{M}=C_3 \frac{Amp. (|e_a|-|r_b|)}{Amp. (|e_a|+|r_b|)}, \quad (43)$$

where |e| stands for the absolute value of e.

Figure 17:
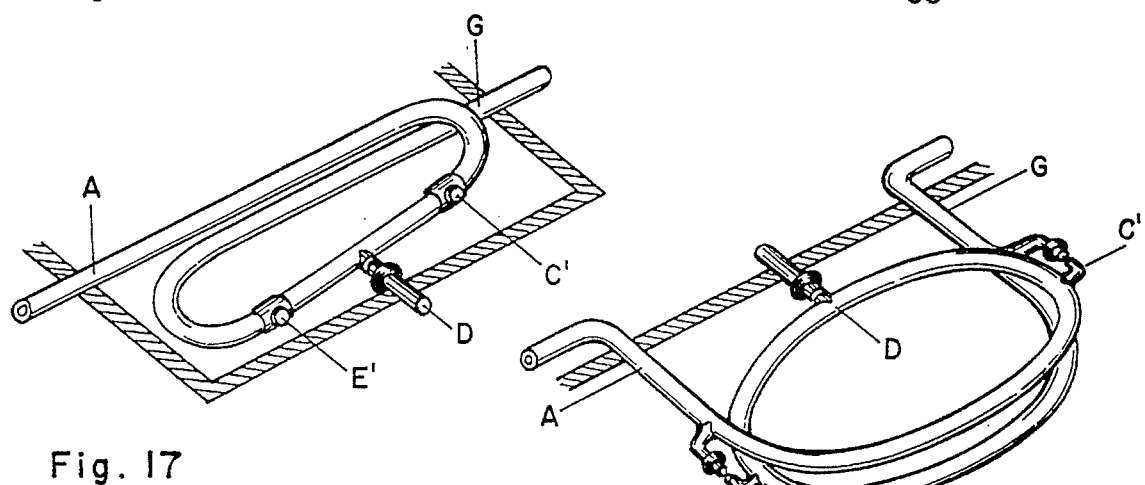
FIG. 17 illustrates an additional embodiment of the mass flowmeter, that can be operated on the principles of the present invention.
Figure 18:
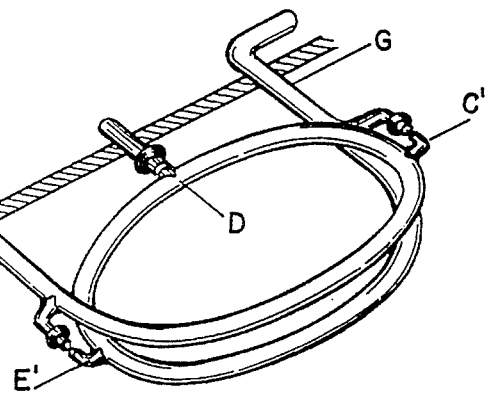
FIG. 18 illustrates another additional embodiment of the mass flowmeter, that can be operated on the principles of the present invention.
Figure 19:
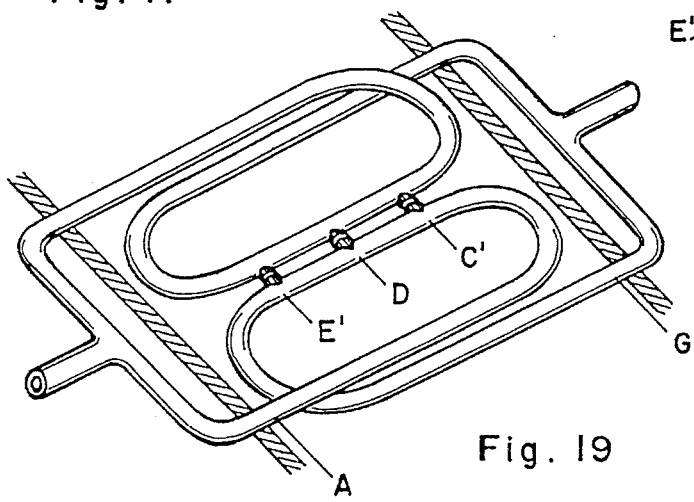
FIG. 19 illustrates a further additional embodiment of the mass flowmeter, that can be operated on the principles of the present invention.

In FIGS. 17 through 19, there are illustrated additional embodiments of the mass flowmeter, which can also be operated on the principles taught by the methods of the present invention. In these embodiments, the electromagnetic vibrator disposed on the plane of symmetry including the midsection D of the conduit vibrates the conduit or conduits in directions substantially parallel to a plane substantially including the looped midsection of the conduit and perpendicular to the midportion of the conduit including the midsection D of the conduit. The two motion sensors respectively disposed on two sections C' and E' in a symmetric relationship with respect to the midsection D of the conduit provide the first and second electrical signals respectively given by the equations (8) and (9).

While the principles of the inventions have now been made clear by the illustrative equations, there will be many modifications in the arrangement of the equations, terms and grouping of the terms in the equations and approximate forms of the equations, which are immediately obvious to those skilled in the art and particularly adapted to the specific working environments and operating conditions without departing from those principles in the practice of the invention. It is not desired to limit the inventions to the particular illustrative equations shown and described and accordingly, all suitable modifications and equivalents of the equations may be regarded as falling within the scope of the inventions as defined by the claims which follow.

The embodiments of the invention, in which an exclusive property or privilege is claimed, are defined as follows:

1. A method for determining mass flow rate of media moving through at least one conduit under a flexural vibration comprising in combination:

a) generating a primary flexural vibration of the conduit in one of the symmetric and antisymmetric modes about a midsection of the conduit by exerting a vibratory force on the conduit;

b) obtaining a first alternating electrical signal representing the flexural vibration of the conduit at a first section of the conduit, and a second alternating electrical signal representing the flexural vibration of the conduit at a second section of the conduit;

c) forming a differential combination of absolute value of the first alternating electrical signal and absolute value of the second alternating electrical signal, wherein absolute value of an alternating electrical signal being equal to the alternating electrical signal when the alternating signal is equal to or greater than zero and equal to minus one times the alternating signal when the alternating electrical signal is less than zero;

d) measuring an amplitude of the differential combination of the absolute values of the first and second alternating electrical signals without integrating the differential combination of the absolute values of the first and second alternating signals; and e) determining mass flow rate of media moving through the conduit as a function of the amplitude of the differential combination of the absolute values of the first and second alternating electrical signals.

2. A method as defined in claim 1 wherein the first and second sections of the conduit are located symmetrically about the midsection of the conduit.

3. A method as defined in claim 1 wherein said method further comprises:

a) forming an additive combination of the absolute value of the first alternating electrical signal and the absolute value of the second alternating electrical signal; and b) measuring an amplitude of the additive combination of the absolute values of the first and second alternating electrical signals;

wherein said step determining mass flow rate determines the mass flow rate as a function of a ratio of the amplitude of the differential combination to the amplitude of the additive combination of the absolute values of the first and second alternating electrical signals.

4. A method as defined in claim 3 wherein the first and second sections of the conduit are located symmetrically about the midsection of the conduit.

5. A method for determining mass flow rate of media moving through at least one conduit under a flexural vibration comprising in combination:

a) generating a primary flexural vibration of the conduit in one of the symmetric and antisymmetric modes about a midsection of the conduit by exerting a vibratory force on the conduit;

b) obtaining a first alternating electrical signal in a normalized form, said first alternating electrical signal representing the flexural vibration of the conduit at a first section of the conduit, wherein a normalized form of an alternating electrical signal being the alternating electrical signal divided by the amplitude of the alternating electrical signal, and a second alternating electrical signal in a normalized form, said second alternating electrical signal representing the flexural vibration of the conduit at a second section of the conduit;

c) forming a differential combination of absolute value of the first alternating electrical signal and absolute value of the second alternating electrical signal, wherein absolute value of an alternating electrical signal being equal to the alternating electrical signal when the alternating signal is equal to or greater than zero and equal to minus one times the alternating electrical signal when the alternating electrical signal is less than zero;

d) measuring an amplitude of the differential combination of the absolute values of the first and second alternating electrical signals without integrating the differential combination of the absolute values of the first and second alternating signals; and e) determining mass flow rate of media moving through the conduit as a function of the amplitude of the differential combination of the absolute values of the first and second alternating electrical signals.

6. A method as defined in claim 5 wherein the first and second sections of the conduit are located symmetrically about the midsection of the conduit.

7. A method as defined in claim 5 wherein said method further comprises:

a) forming an additive combination of the absolute value of the first alternating electrical signal and the absolute value of the second alternating electrical signal; and b) measuring an amplitude of the additive combination of the absolute values of the first and second alternating electrical signals;

wherein said step determining mass flow rate determines the mass flow rate as a function of a ratio of the amplitude of the differential combination to the amplitude of the additive combination of the absolute values of the first and second alternating electrical signals.

8. A method as defined in claim 7 wherein the first and second sections of the conduit are located symmetrically about the midsection of the conduit.

* * * * *